United States Patent [19]

Schopf et al.

[11] 4,443,482

[45] * Apr. 17, 1984

[54] BUTTERED TABLE SYRUP IN POLYOLEFIN BOTTLE

[75] Inventors: Larry D. Schopf, Saginaw; Jerome K. Sakowicz, Springfield; Hugh L. Trenk, Augusta, all of Mich.

[73] Assignee: General Foods Corporation, White Plains, N.Y.

[*] Notice: The portion of the term of this patent subsequent to Mar. 23, 1999 has been disclaimed.

[21] Appl. No.: 360,969

[22] Filed: Mar. 23, 1982

Related U.S. Application Data

[63] Continuation-in-part of Ser. No. 197,837, Oct. 17, 1980, Pat. No. 4,321,279.

[51] Int. Cl.$^3$ .......................... A23L 1/09; A23L 3/34; B65B 29/00
[52] U.S. Cl. .................................. 426/106; 426/324; 426/330; 426/654; 426/658; 426/542; 426/544; 426/546; 426/397
[58] Field of Search ............... 426/106, 658, 324, 330, 426/654, 542, 546, 544, 392, 397

[56] References Cited

U.S. PATENT DOCUMENTS

| | | | |
|---|---|---|---|
| T102,603 | 1/1983 | McIntyre | 426/658 |
| 3,057,734 | 10/1962 | Pader | 426/658 |
| 3,282,707 | 11/1966 | Topalian et al. | 426/658 |
| 3,362,833 | 1/1968 | Smith | 426/658 |
| 4,073,963 | 2/1978 | Daggy | 426/658 |
| 4,226,895 | 10/1980 | Miller et al. | 426/658 |
| 4,321,279 | 3/1982 | Schopf | 426/106 |

OTHER PUBLICATIONS

Emulsions: Theory and Practice, 2nd ed., P. Becher Reinhold Publ. 1965.
Industrial Gums, Whistler 2nd ed. 1973, Academic Press.
A Consumer's Dictionary of Food Additives Winter, Crown Publ. 1972.

*Primary Examiner*—Steven L. Weinstein
*Attorney, Agent, or Firm*—Walter Scott; Thomas R. Savoie; Daniel J. Donovan

[57] ABSTRACT

A buttered table syrup is provided in a polyolefin bottle. An emulsifier is selected which provides a storage stable product. The product does not develop an objectionable off-flavor when packaged in a polyolefin container. The emulsifier contains carageenin and pectin, and may further contain locust bean gum, and/or carboxymethylcellulose.

11 Claims, No Drawings

BUTTERED TABLE SYRUP IN POLYOLEFIN BOTTLE

DESCRIPTION

This is a continuation in part of application Ser. No. 197,837, filed Oct. 17, 1980, which is now U.S. Pat. No. 4,321,279.

TECHNICAL FIELD

This invention relates to bottled buttered table syrup and to a method of bottling a buttered table syrup.

BACKGROUND OF INVENTION

In recent years there have been developed buttered table syrups which are stable and homogeneous. By the term "buttered table syrup" is meant a table syrup product having a sugar solids content of at least 65% by weight and butter in an amount of 1–5% by weight. By the term "butter" is meant whole butter or its equivalent such as butter fat or anhydrous butter oil.

Various emulsifiers are reported in the patent literature as being useful for buttered table syrups.

Pader, U.S. Pat. No. 3,057,734, discloses the use of water soluble proteins, gum arabic, and edible algin derivatives. For maximum emulsion stability, Pader prefers the polyhydric alcohol esters of alginic acid, e.g. propylene glycol ester of alginic acid. Pader also discloses that several other materials are not effective. Included among these are: fatty acid based emulsifiers such as "Spans" and "Tweens"; and gums other than gum arabic, gum arabic being useful with casein and its derivatives.

Topalian, U.S. Pat. No. 3,282,707 discloses the use of gum ghatti to stabilize a sugar syrup, and Smith, U.S. Pat. No. 3,362,833 discloses the use of gum ghatti and lecithin for the same purpose.

Daggy, U.S. Pat. No. 4,073,963, discloses the use of an emulsifier system for a buttered table syrup in which sodium stearoyl-2-lactylate and sorbitan monostearate are used. Daggy reports that several other materials are not useful. Among these are: xanthan gum, carrageenin gum, locust bean gum, guar gum, and pectin.

Difficulties have arisen, when stabilizers-emulsifiers such as carrageenan or lecithin alone are employed in stabilizing products such as table syrups, which must of necessity undergo prolonged storage in bottles or other containers prior to consumer use. Separation of the oil and aqueous phases has been noted when a table syrup employing an oil phase such as butter remains on the shelves of the retail outfit for several months. In many instances, there is at least partial separation of phases, which phases cannot be completely put into solution by the consumer by shaking the bottle. This separation constitutes an important disadvantage of buttered table syrups and has met with consumer dissatisfaction.

While the previously known emulsifiers are quite useful in providing storage-stable products in glass containers, a problem arises when these otherwise storage-table buttered table syrup products are bottled in polyolefin bottles such as polypropylene or polyethylene bottles. We have found that, when a stable buttered table syrup is bottled in a plastic bottle of this type, a substantial and objectionable off-flavor develops after a relatively short period of time.

It is an object of the present invention to provide a pourable, stable table syrup which does not develop an objectionable off-flavor when bottled in a polyolefin bottle. It is a further object of the invention to provide a method of bottling, in a polyolefin bottle, a stable buttered table syrup which does not develop an objectionable off-flavor.

The present invention should provide a stabilized emulsion which has improved stability against separation over prolonged periods of storage and is suitable for use as table syrup, topping, or the like.

The emulsion should further exhibit marked resistance to separation under repeated freeze-thaw cycles.

BRIEF SUMMARY OF THE INVENTION

The foregoing and other objects which will be apparent to those of ordinary skill in the art are achieved in accordance with the present invention by providing a bottled buttered table syrup comprising a polyolefin bottle containing a table syrup, said table syrup containing at least about 65% by weight sugar solids, butter in an amount of 1–5% by weight based on the weight of the syrup, and from 0.05 to 0.52% by weight of the syrup of an emulsifier, and by providing a method of bottling a table syrup in a polyolefin bottle which comprises filling a polyolefin container with said table syrup, and closing said container.

The emulsifier system contains two of the following: 0.01 to 0.2%, by weight of syrup, of pectin, 0.01 to 0.2% of carrageenin, 0 to 0.2% locust bean gum, and 0 to 0.5% of carboxymethylcellulose, but at least one component is either pectin or carrageenin.

DETAILED DESCRIPTION

The buttered table syrups to which the present invention relate are known per se and are fully described in the prior art patents mentioned above, the disclosures of which are herein incorporated by reference. In general, the syrup is pourable at normal room temperature and contains at least 65% by weight sugar solids, from 1–5% butter, an emulsifier or stabilizer to provide a stable oil-in-water emulsion, and various conventional additives such as color, flavor, and the like.

The emulsifier system of the present invention comprises carrageenin and/or pectin and may also include locust bean gum, carboxymethylcellulose, and combinations of locust bean gum and carboxymethylcellulose. Of course, each of these ingredients is of food grade. It is preferred that the emulsifier system contain 0.01 to 0.2% pectin and/or 0.01 to 0.2% carrageenin. It is further preferred that the emulsifier system contain 0.03 to 0.1% pectin and/or 0.03 to 0.1% carrageenin. However, it is still further preferred that the emulsifier system also contain 0.01 to 0.2% locust bean gum or 0.05 to 0.5% carboxymethylcellulose, it is more preferred that locust bean gum or carboxy methylcellulose is combined with both pectin and carrageenin, and it is most preferred that the emulsifier system contain 0.03 to 0.1% locust bean gum or 0.05 to 0.15% of a medium viscosity and chain length carboxymethylcellulose with a 3100 centipoise viscosity when suspended in a 2% aqueous solution, such as Hercules 9M31XS or 0.08 to 0.2% of a medium viscosity and chain length carboxymethylcellulose with a 800 centipoise viscosity when suspended in a 2% aqueous solution, such as Hercules 7M8SXF. It is most preferred that the emulsifier contain 0.03 to 0.1% pectin and carrageenin. The total amount of the emulsifier system is 0.05 to 0.52%, preferably 0.1 to 0.3% by weight, same basis. An emulsifier system may be conveniently provided by using a prepared aqueous, food grade, emulsifier such as "Frimulsion 6G", a commercial product (Hercules Company) containing about 26% by weight locust bean gum, about 20% by carrageenin, and about 14% by weight pectin.

It is primarily intended that the stable emulsion, which is an important part of the present invention, be adapted for food use, specifically for use as a table syrup, the quantities of some of the ingredients therein will be subject to variations in accordance with the particular use to which the syrup is to be adapted and the grade and flavor of the product to be manufactured. Table syrup in its most preferred form is a cane-corn syrup blend in which, in the present invention, butter and maple syrup or maple flavor are incorporated; it will be apparent that the amount of butter in the syrup, as well as the amount of maple syrup or maple flavor will vary in accordance with consumer preference and the retail price at which the syrup is to be marketed. In addition, if the syrup is to be utilized to pour over ice cream and for general fountain use, as well as a topping for pancakes, waffles and the like, it may be desirable to increase the sugar solids content of the aqueous phase of the emulsion well beyond 65 percent up to about 80 percent or more, providing the syrup or topping is still pourable.

Consequently, while in its most preferred form the syrup is contemplated as having about 2 percent butter or other oil by weight of the emulsion, the amount of oil will vary to a preferred range of about 1 to 5 percent to a broad range of about 1 to 10 percent. In addition, where maple syrup is used as a flavoring ingredient, the most preferred amount of such maple syrup used is presently about 2 percent by weight of the finished emulsion. It will, of course, be apparent that a more expensive product would incorporate greater amounts of maple syrup, which is relatively expensive compared to a cane-corn syrup blend. Artificial flavors may be used to replace the costly maple syrup. While, as stated, the percentage of sugar solids in the aqueous phase will generally be at least about 65 percent, increased viscosity requirements will result in increased sugar content. The sugar content should not be so high that crystallization will occur at conventional storage temperatures or that the syrup will become nonpourable and must be spooned from its container.

One of the properties of polyolefin material is that it is a poor gas barrier. Therefore the protection of the fat particles from oxidation must be accomplished to prevent stale flavor notes.

The emulsifier system of the present invention provides both a stable oil and water emulsion as well as preventing the development of off-flavors. The following hypothosis is used to explain this latter phenomena of the invention. However, the hypothosis of the existence and mechanism by which the invention prevents the development of off-flavor is not designed to limit the scope of the present invention, but is advanced only as a means of explaining the effects produced.

The emulsifier of this invention has the ability to stabilize a homogeneous buttered syrup with much larger fat particle sizes than conventional propylene glycol ester of alginic acid-stabilized syrups. By obtaining larger fat particls, the surface area to volume ratio of fat is reduced. This may act to decrease the available sights for oxidation of the fat. In addition, the emulsifier system of the present invention may have antioxident powers through physically protecting (or coating) the fat particles or through chemically altering or binding precursors that form the compounds responsible for the stale flavor notes.

It is presently believed that a combination of any two of the three emulsifiers, carrageenin, pectin, and locust bean will provide product stability and eliminate any off-flavor notes. Emulsions made with conventional prior art emulsifiers, such as propylene glycol alginate, produce particles sizes of the range of one micron. An emulsion made with a commercially available pectin marketed by the Hercules Company, known as HMBB Rapid Set Pectin produces an average fat particle size of 7 microns. Other pectins that have been successful are the low methoxy pectins, especially the conventional and amidated low methoxy pectins. An emulsion made with commercially available carrageenans, also from Hercules, known as Type J (iota) or Type UE (kappa), produces an average particle size of approximately one micron. An emulsion made with a commercially available combination of locust gum and carrageenan, marketed by the Hercules Company and sold under the Trademark of Genulacta PL-93 had an average particle size of seven microns. It has been determined that the average particle size using the "Frimulsion 6G" emulsifying system is in the range of 7 microns. It is therefore believed that it is desirable to have an average fat particle size of greater than 4 microns and more preferably greater than 6 microns but less than 9 microns.

A preferred method of preparing the buttered table syrup is as follows. A gum pre-solution is made by dispersing and dissolving the emulsifiers in soft water at about 49° to 60° C. (approximately 120°–140° F.) and held for about one hour to solubilize the emulsifiers, with the weight of the water being about 10 to 100 times the total weight of the emulsifiers. A blend of sugar syrups, flavor, etc, is made up and heated to a temperature of about 71° C. to 82° C. (approximately 160°–180° F.). The gum pre-solution and sugar syrup blend are admixed and blended for about 5–10 minutes. Melted whole butter, heated to a temperature of about 60° C. (approximately 140° F.) maximum, is then added and blended for an additional 5–10 minutes. The blend is then heated to a temperature of about 71° C. to 85° C. (approximately 160°–185° F.), adjusted, if necessary, to a desired sugar solid content by the addition of water, and homogenized at a single stage homogenizer pressure of approximately 4000 psi. The product is then bottled at about 77° C. to 80° C. (approximately 170°–175° F.). These are conventional steps used by the table syrup industry. Deviations from anyone of the listed processing conditions is within the contemplation of this invention.

EXAMPLE I

The procedure described above is followed. The sugar solids content is adjusted to 70°–71° Brix by the addition of water.

The following formulation is used:

|  | Parts by wt |
|---|---|
| Gum presolution | |
| Emulsifier System (Frimulsion 6G) | 0.200 |
| 26 wt % locust bean gum | |
| 20 wt % carrageenan | |
| 14 wt % pectin | |
| Soft Water | 3.128 |
| Sugar Blend | |
| Liquid sugar syrup | 73.600 |

-continued

| | Parts by wt |
|---|---|
| 42 DE corn syrup | 20.527 |
| Flavor and color | 0.400 |
| Sodium Benzoate | 0.050 |
| Citric Acid | 0.016 |
| Trisodium citrate | 0.069 |
| Whole Butter | 2.000 |
| | 100.000 |

The product is bottled in two types of containers: polyacrylonitrile, and polypropylene. As a comparison, a similar table syrup is prepared using 0.2% of a commercially available propylene glycol ester of alginic acid, known as PGA for short notation and "Kelcoloid S" as the tradename, and bottled in the two types of plastic bottles. Neither product produces an objectionable off-taste when stored in the polyacrylonitrile container. An objectionable off-flavor develops in the table syrup in the polypropylene container stabilized with propylene glycol ester of alginic acid. However, no such off-flavor is produced in the table syrup in the polypropylene container stabilized with the three-component stabilizer system disclosed above.

EXAMPLE II

Using the procedure previously described, the following formulaion was prepared:

| Ingredient | % By Weight |
|---|---|
| 63 DE corn syrup (82% solids) | 49.290 |
| Liquid sugar 67.5° Brix | 23.387 |
| 42% High fructose corn syrup (71% solids) | 19.273 |
| Whole butter | 2.0 |
| Sodium benzoate | 0.04 |
| Scorbic Acid | 0.05 |
| Trisodium citrate | 0.12 |
| Citric acid | 0.005 |
| Flavor | 0.15 |
| Salt | 0.30 |
| Color | 0.02 |
| Soft water | 5.265 |
| Low methoxyl 20 amidated pectin | 0.08 |

The resulting syrup was bottled in polypropylene bottles, cooled to ambient temperature, and thereafter stored for two weeks at 120° F. The emulsion stabiliity was found to be preserved throughout the two-week accelerated storage test.

EXAMPLE III

Example II was repeated using as the emulsifier 0.05% low-methoxyl 20 amidated pectin and 0.05 iota carrageenan (Type J from Hercules Company) in place of the 0.08 pectin. This syrup was also found to be stable through the two-week accelerated storage study.

EXAMPLE IV

Example II was repeated using 0.08 iota carrageenan as the emulsifier and comparable emulsion stability results were obtained.

Having thus described the invention in a manner which will enable those skilled in the art to understand and practice it, what is claimed is.

1. A bottled buttered table syrup comprising a polyolefin container containing a table syrup, said table syrup containing at least about 65% by weight sugar solids, butter in an amount of 1-5% by weight based on the weight of the syrup, and from 0.05 to 0.52% by weight of an emulsifier, said emulsifier containing from 0.01 to 0.2% by weight, based on the weight of the syrup, of carrageenin, and from 0.01 to 0.2% by weight, based on the weight of the syrup, of pectin.

2. A bottled buttered table syrup according to claim 1 wherein said emulsifier comprises from 0.05 to 0.2% by weight carboxymethylcellulose, from 0.01 to 0.2% by weight carrageenin, and from 0.01 to 0.2% by weight pectin, based on the weight of the table syrup.

3. A bottled buttered table syrup according to claim 1 wherein said container comprises polypropylene.

4. A bottled buttered table syrup according to claim 1 wherein said sugar solids result from the table syrup containing liquid sugar syrup and corn syrup.

5. A method of bottling a table syrup in a polyolefin container which comprises filling a polyolefin container with a table syrup, said table syrup containing at least about 65% by weight sugar solids, butter in an amount of 1-5% by weight based on the weight of the syrup, and from 0.05 to 0.4% by weight of an emulsifier, said emulsifier comprising from 0.01 to 0.2% by weight, based on the weight of the syrup, of carrageenin, and from 0.01 to 0.2% by weight, based on the weight of the syrup, of pectin, and closing said container.

6. A method according to claim 5 wherein said emulsifier comprises from 0.05 to 0.2% by weight carboxymethylcellulose, from 0.01 to 0.2% by weight carrageenin, and from 0.01 to 0.2% by weight pectin, based on the weight of the table syrup.

7. A method according to claim 5 wherein said container comprises polypropylene.

8. A method according to claim 5 wherein said buttered table syrup is prepared by the steps of: admixing said carrageenin and pectin with water, the weight of water being about 10 to 100 times the total weight of said carrageenin, and pectin, to form an aqueous emulsifier; admixing a sugar syrup and the aqueous emulsifier to form a sugar syrup-emulsifier admixture; admixing melted butter and the syrup-emulsifier admixture to form a buttered admixture; and homogenizing said buttered mixture to form said buttered table syrup.

9. A method according to claim 8 wherein said water is at a temperature of from 120° to 140° F. and wherein said aqueous emulsion is held for a period of time sufficient to solubilize the emulsifiers.

10. A method according to claim 9 wherein said melted butter is at a temperature of not more than 140° F.

11. A method according to claim 8 wherein the buttered admixture is blended for a time sufficient to form a homogeneous admixture and is thereafter heated to a temperature of 170°-185° F., wherein water is added, if necessary, to adjust the sugar solids content to a desired level, and wherein the resulting syrup is maintained at a temperature of 170°-175° F. while being bottled.

* * * * *